United States Patent [19]
Sofman et al.

[11] Patent Number: 6,047,118
[45] Date of Patent: Apr. 4, 2000

[54] METHOD OF AND SYSTEM FOR DETERMINING OPTIMAL OVERTRUNKING IN AN OPTICAL TELECOMMUNICATIONS NETWORK

[75] Inventors: Lev B. Sofman, Plano; Barry L. Chapman, Mesquite, both of Tex.

[73] Assignee: MCI Communications Corporation, Washington, D.C.

[21] Appl. No.: 08/987,481

[22] Filed: Dec. 9, 1997

[51] Int. Cl.[7] .................................................... G06F 9/455
[52] U.S. Cl. .............................. 395/500.34; 395/500.23; 359/109
[58] Field of Search .............................. 395/500, 500.23, 395/500.34; 379/1, 219, 242, 272; 370/228

[56] References Cited

U.S. PATENT DOCUMENTS 5,357,556  10/1994  Dresser ...................................... 397/27
5,844,886  12/1998  Szentesi .................................. 370/230

OTHER PUBLICATIONS

DNM Tools—User Guide—Software Release 3.0—Jun. 1997.

Chow et al, "A Fast Distributed Network Restoration Algorithm", IEEE Twelfth Annual International Phoenix Conference on Computers and Communications, pp. 261–267, Mar. 1993.

Johnson et al, "Distributed Restoration Strategies in Telecommunications Networks", IEEE International Conference on Communications SUPERCOMM/ICC '94, pp. 483–488, May 1994.

Veerasamy et al, "Space Capacity Assignment in Telecom Networks using Path Restoration", IEEE Proceedings of the Third International Workshop on Modeling, Analysis, and Simulation of Computer and Telecommunications Systems, pp. 370–374, Jan. 1995.

Primary Examiner—Kevin J. Teska
Assistant Examiner—Samuel Broda

[57] ABSTRACT

A method of and a system for performing computer simulations to determine a number of blocked calls resulting from cutting selected spans in a telecommunications network with selected levels of overtrunking to determine a level of overtrunking necessary to make the number of block calls resulting from a cut span less than a blocked call threshold. The method forms a capacity demand matrix based on a selected level of overtrunking. The capacity demand matrix reflects a circuit capacity between each pair of origination nodes and destination nodes of the network prior to a cut span. The method forms updated capacity demand matrices that reflect the circuit capacity between each pair of origination nodes and destination nodes of the network after a cut span with various levels restoration. The method runs a call simulation program with data from the updated capacity demand matrices to determine the number of blocked calls resulting from said cut span. The method compares the number of blocked calls for various levels of overtrunking to a blocked call threshold to determine an optimal level overtrunking for the network.

17 Claims, 7 Drawing Sheets

6,047,118

METHOD OF AND SYSTEM FOR DETERMINING OPTIMAL OVERTRUNKING IN AN OPTICAL TELECOMMUNICATIONS NETWORK

CROSS-REFERENCE TO RELATED APPLICATIONS

The present Application is related to co-pending U.S. Pat. No. 5,946,295, filed on May 23, 1998 and issued on Aug. 31, 1999, titled Method of Routing and Multiplexing Demands in a Telecommunications Network, Attorney Docket No. RIC-96-122(20350.00020), and application Ser. No. 08/954,780 and filed Oct. 21, 1997 titled Method of Selecting Spans for Fiber Cut Simulations, Attorney Docket No. RIC-97-105 (20350.00047).

FIELD OF THE INVENTION

The present invention relates generally to telecommunication network design, and more particularly to a method of and system for determining an optimal level of overtrunking for a network by running computer simulations to determine the number of blocked calls resulting from the cutting of selected fiber spans with selected levels of overtrunking.

DESCRIPTION OF THE PRIOR ART

Modern digital telecommunications systems are built upon a network consisting of a plurality of nodes or sites that are interconnected by spans or transmission facilities. A primary goal of telecommunications network design is to serve the demand in capacity between nodes at the least cost, while maintaining an acceptable level of survivability in the event of failures. Two elements of cost in a network are transmission cost and equipment cost. Transmission cost is generally based upon the transmission distance. An element of equipment cost is the cost per port necessary to demultiplex multiple channels into a single channel.

Typical telecommunications networks have a mixture of ring and mesh or non-ring topology, in which there are alternate paths through the network between nodes. When there is a facility failure, as for example, when an optical fiber span is cut, there are potentially separate paths to which the traffic on the cut fiber can be switched. However, restorability requires that the network have excess capacity that may be used in the case of a failure. For example, if a span between two nodes is cut and there is exactly enough capacity in the network to meet the demand prior to the cut, there is no place to put the traffic carried by the cut span. Thus, a network with no excess capacity may not be restorable in the event of a cut span. In order to provide an acceptable level of restorability, excess capacity must be built into the network. However, excess capacity increases the cost of the network.

Network designers currently have available various tools for use in designing networks and modeling network performance. For example, Nortel has available a set of dynamic network modeling tools (DNM tools software release 3.0) that include a dimensioner and a simulator. The dimensioner tool uses point-to-point traffic statistics, targeted blocking parameters, and network configuration to produce an optimally sized network. The simulator tool evaluates network performance by performing call simulations according to defined scenarios. In U.S. Pat. No. 5,946,295, filed on May 23, 1997 and issued on Aug. 31, 1999, titled Method of Routing and Multiplexing Demands in a Telecommunications Network, attorney docket number RIC96-122 (20350.00020) there is disclosed a method of constructing demand routes in a telecommunications network based upon point-to-point capacity demands. However, there is currently no tool or integrated set of tools for a network designer to use in determining an optimal level of excess capacity or overtrunking in a telecommunications network.

SUMMARY OF THE INVENTION

The present invention provides a method of and a system for performing computer simulations to determine a number of blocked calls resulting from cutting selected spans in a telecommunications network with selected levels of overtrunking to determine a level of overtrunking necessary to make the number of block calls resulting from a cut span less than a blocked call threshold. Briefly, the method of the present invention forms a capacity demand matrix based on a selected level of overtrunking. The capacity demand matrix reflects a circuit capacity between each pair of origination nodes and destination nodes of the network prior to a cut span. The method forms updated capacity demand matrices that reflect the circuit capacity between each pair of origination nodes and destination nodes of the network after a cut span with various levels of restoration. The method runs a call simulation program with data from the updated capacity demand matrices to determine the number of blocked calls resulting from said cut span. The method compares the number of blocked calls for various levels of overtrunking to a blocked call threshold to determine an optimal level overtrunking for the network.

The method forms the capacity demand matrix by multiplying traffic matrices by the selected overtrunking percentage to form inflated traffic matrices. The traffic matrices include the volume of calls, expressed in units such as hundred call seconds (CCS) or Erlangs, between each origination node and each destination node of the network being simulated. The method uses a dimensioning tool to generate the capacity demand matrix based upon the inflated traffic matrices. The capacity demand matrix reflects the number of circuits between each destination-origination node pair of the network with the selected level of overtrunking.

The method uses the capacity demand matrix to determine ring and non-ring demand-routes in the network. The method generates a ring demand-route file and a non-ring demand file by selecting an origination node and a destination node from the capacity demand matrix. If the selected origination node and the selected destination node are not in the same ring, the method writes a non-ring demand record in the non-ring demand file. The non-ring demand record comprises the selected origination node, the selected destination node, and the capacity between the selected origination and destination nodes. The method uses a bandwidth management tool, such as the one disclosed in co-pending U.S. Pat. No. 5,946,295, filed on May 23, 1997 and issued on Aug. 31, 1999, titled Method of Routing and Multiplexing Demands in a Telecommunications Network, Attorney Docket No. RIC-96-122(20350.00020), to form a non-ring demand-route file based upon the non-ring demand file.

If the selected origination and destination nodes are in the same common ring, the method finds the route through the ring between the origination and destination nodes with the minimum number of intermediate nodes and writes a ring demand-route record in the ring demand-route file. The ring demand-route record comprises the selected origination node, the selected destination node, the route through the ring between the origination and destination nodes with the minimum number of intermediate nodes, and the capacity of the ring demand-route.

The method uses the ring and non-ring demand route records to generate ring and non-ring cut span tables, respectively. Each of the cut span tables includes a row for each demand-route and a column for each span of the network. Each cut span table contains the capacity of each span of each demand-route of the network. The method uses the ring and non-ring cut span tables to generate for a selected cut span from a set of spans ring and non-ring impact demand matrices. The impact demand matrices each comprise a column for each origination node and a row for each destination node of the network. The impact demand matrices contain the amount of ring and non-ring capacity lost due to cutting the selected span.

The method forms a first updated capacity demand matrix by subtracting from the capacity demand matrix the sum of the non-ring impact demand matrix and the ring impact demand matrix. The first updated capacity demand matrix reflects the capacity between each pair of origination nodes and destination nodes of the network after the selected span is cut and prior to ring restoration of the network. The method forms a second updated capacity demand matrix by subtracting the non-ring impact demand matrix from the capacity demand matrix. The second updated capacity demand matrix reflects the capacity between each pair of origination nodes and destination nodes of the network after ring restoration and prior to non-ring restoration (for example digital cross connect restoration) of the network. The method forms a third updated capacity demand matrix by multiplying the non-ring impact demand matrix by a restoration coefficient, which reflects the amount of capacity not restored to the network after non-ring restoration, and subtracting from the capacity demand matrix the non-ring impact demand matrix multiplied by the restoration coefficient. The third capacity demand matrix reflects the capacity between each pair of origination nodes and destination nodes of the network after non-ring restoration of said network.

The method runs a computer simulation tool with the data in the first updated capacity demand matrix to determine the number of blocked calls resulting from a cut of the selected span with the selected overtrunking percentage prior to any restoration. The method runs the computer simulation tool with data in the second updated capacity demand matrix to determine the number of blocked calls resulting from a cut of the selected span with the selected overtrunking percentage after ring restoration and prior to non-ring restoration.

The method runs the simulator on the third updated capacity demand matrix to determine the number of blocked calls resulting from a cut of the selected span with the selected overtrunking percentage after non-ring restoration. The method then aggregates the numbers of blocked calls resulting from a cut of the selected span with the overtrunking percentage prior to restoration, after ring restoration and prior to non-ring restoration, and after non-ring restoration to form a aggregated number of blocked calls resulting from the cut of said selected span with the selected overtrunking percentage.

DESCRIPTION OF THE PREFERRED EMBODIMENT

Figure 1:
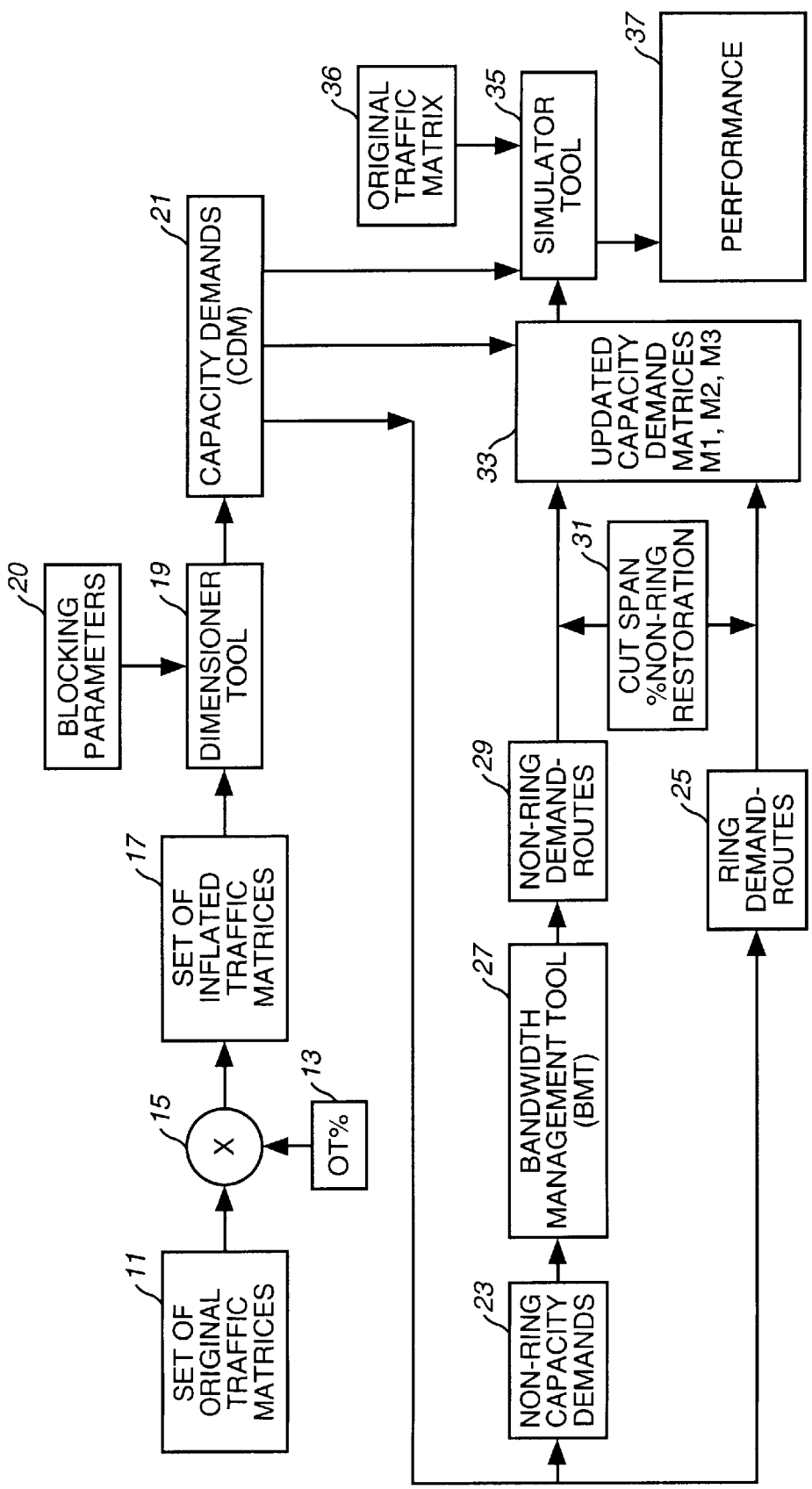
FIG. 1 is a block diagram of the architecture of the system of the present invention.

In FIG. 1 of the drawings, there is shown an architectural diagram of the system according to the present invention. The system starts with a set of original traffic matrices, as indicated at block 11.

The traffic matrices define the point-to-point mean volume, variance, and mean holding of telephone call traffic between each origination node and each destination node of the network for various times of the day. Since telephone traffic exhibits a Poisson distribution, the mean and variance matrices are identical. Mean holding time is a measure of the mean length of telephone calls between each origination and destination pair. The mean and variance of the traffic matrices may be expressed in either hundred call seconds (CCS) or Erlangs. The mean holding time is expressed in seconds.

According to the present invention, the mean and variance portions of the original traffic matrices are multiplied by an overtrunking percentage 13 as indicated at block 15. Multiplication of the original traffic matrices produces a set of inflated traffic matrices, as indicated at block 17. In the set of inflated traffic matrices, each element is inflated by the overtrunking percentage. For example, with a 5% overtrunking percentage, each mean and variance of the set of inflated traffic matrices is 1.05 times the corresponding mean and variance of the original set of traffic matrices.

The set of inflated traffic matrices is processed with a dimensioner tool, as indicated generally at block 19. In the preferred embodiment, the dimensioner tool is the dimensioner of the DNM Tools Software release 3.0, produced by Nortel. The dimensioner tool generates for given blocking parameters 20 a cost optimized network based upon the set of inflated traffic matrices 17. The output of dimension tool 19 is a capacity demand matrix, as indicated generally at block 21. A capacity demand matrix is a square matrix that sets forth the circuit capacity between each origination and destination pair of the network to support the inflated traffic demand.

As will be explained in detail hereinafter, the system of the present invention separates the capacity demands into non-ring capacity demands, as indicated at block 23, and ring demand-routes, as indicated at block 25. The system of the present invention uses a bandwidth management tool, such as the system described in U.S. Pat. No. 5,946,295, filed on May 23, 1997 and issued on Aug. 31, 1999, titled Method of Routing and Multiplexing Demands in a Telecommunications Network, attorney docket number RIC-96-122 (20350.00020), the disclosure of which is incorporated herein by reference, indicated at block 27, to produce a set of non-ring demand-routes as, indicated at block 29.

As will be explained in detail hereinafter, the system of the present invention uses a selected cut span and a selected percentage of non-ring restoration, as indicated at block 31, to produce updated capacity demand matrices, as indicated block 33. In the preferred embodiment, the set of cut spans is selected according to the method disclosed in application Ser. No. 08/954,780 and filed Oct. 21, 1997, titled Method of Selecting Spans for Fiber Cut Simulations, attorney docket number RIC-97-105 (20350.00047), the disclosure of which is incorporated herein by reference. The percentage of non-ring restoration is determined empirically and it is a measure of the amount of non-ring capacity restored to the network with non-ring restoration.

The updated capacity demand matrices include matrices M1, M2, and M3. Matrix M1 reflects the capacity of the network immediately after the selected span is cut and before ring restoration of the network occurs. In typical networks, ring restoration occurs about 50 milliseconds after a cut fiber is detected. Thus, matrix M1 reflects the capacity of the network over a very short 50 millisecond window after the selected fiber is cut.

Matrix M2 reflects the capacity of the network in the period between ring restoration and non-ring restoration. Non-ring restoration (for example digital cross connect restoration) is typically much slower than ring restoration and it may occur as much as eight minutes after the fiber cut is detected. Thus, matrix M2 reflects the capacity of the network in a window starting about 50 milliseconds after the fiber cut and ending about 480 seconds after the fiber cut.

Matrix M3 reflects the capacity of the network after non-ring restoration has occurred. Typically, non-ring restoration does not restore 100% of the capacity of the network. For example, non-ring restoration may restore only about 75% of the capacity lost as a result of the fiber cut.

Updated capacity demand matrices M1, M2, and M3, are input to a simulator tool, as indicated generally at block 35. In the preferred embodiment, simulator tool 35 is the simulator of DNM Tools Software release 3.0, available from Nortel. The simulator tool uses one of the original traffic matrices, as indicated at block 36, to simulate calls on the network as configured according to the capacity demand matrix CDM or updated capacity demand matrices M1, M2, or M3. The output of the simulator tool that is of interest to the present invention is the number of blocked calls. Thus, the simulator tool provides a measure of the number of blocked calls for the network during each of the windows in which updated capacity demand matrix M1, M2, or M3 is applicable. The numbers of blocked calls during the various time windows are collected and aggregated in a report, which will be described in detail hereinafter, and indicated generally as performance at block 37.

Figure 2:
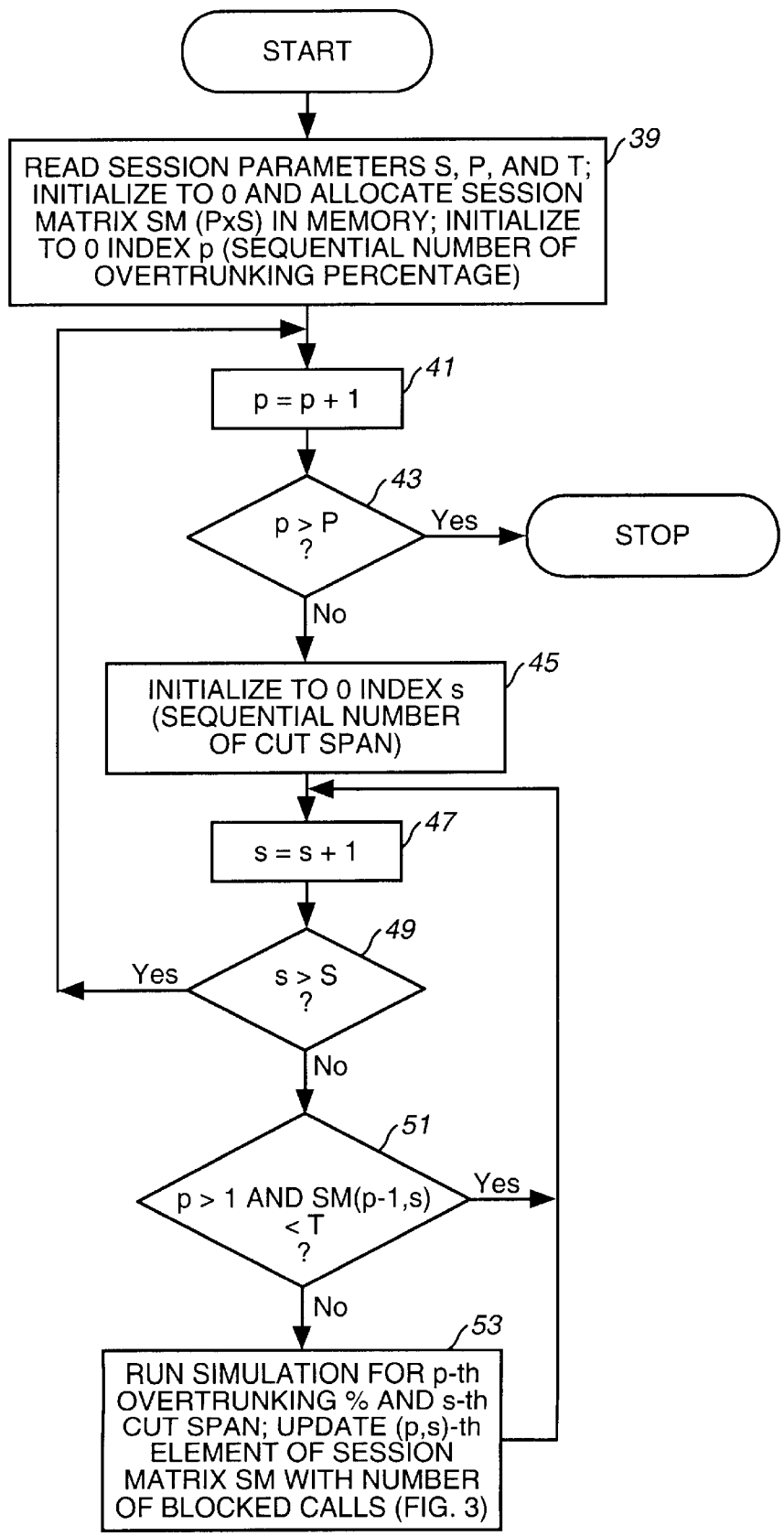
FIG. 2 is a flowchart of a preferred software implementation of the method of the present invention.

The present invention is preferably a computer implemented process, which is illustrated in the flowcharts of FIGS. 2–7. Referring first to FIG. 2, the system reads the session parameters, initializes and allocates a session matrix in memory, and sets to zero an index p, which is the sequential number of the overtrunking percentage, at block 39. The session parameters include the set of cut spans S, the ordered set of overtrunking percentages P, and the blocked calls threshold T. The sample set of cut spans S is a set of spans, preferably selected in accordance with application Ser. No. 08/954,780, and filed Oct. 21, 1997 attorney docket number RIC-97-105 (20350.00047). A network may have hundreds of spans, but only certain spans may be critical spans for purposes of fiber cut simulation. The set of overtrunking percentages P is ordered in ascending order preferably in the range of 5% to 20% in 5% increments. The blocked calls threshold T is the number selected as defining acceptable service. For example, a cut fiber that results in more than 90,000 blocked calls over the course of one hour is an FCC reportable event. Thus, in the preferred embodiment, the blocked calls threshold T is set at 90,000 blocked calls. The session matrix SM is a P×S matrix that holds the results, i.e. number of blocked calls, of the simulation over the set of cut spans S and the set of overtrunking percentages P.

After the session parameters have been read and the session matrix has been initialized, the system sets p=p+1, at block 41, and tests, at decision block 43, if p is greater than P, i.e., if all overtrunking percentages from the set have been processed. If so, processing stops. Otherwise, the system initializes to zero an index s, which is the sequential number of the cut span from the set of cut spans, at block 45. Then, the system sets s=s+1, at block 47, and tests, at decision block 49, if s>S, i.e., if all spans from the set of cut spans have been processed. If so, processing continues at block 41.

If, at decision block 49, not all spans from the set of cut spans have been processed, the system tests, at decision block 51, if p is greater than one AND element (p-1, s) of the session matrix SM is less than the blocked calls threshold T. In other words, the system determines if at least one overtrunking percentage p for the selected cut span s has been processed and if the preceding overtrunking percentage p-1 for the selected cut span s resulted in a number of blocked calls less than the blocked calls threshold T, which indicates that an acceptable level of overtrunking has already been found for cut span s. If so, processing continues at block 47. Otherwise, processing continues at block 53, where the system runs a simulation for the selected p-th overtrunking percentage and the selected s-th cut span, as shown in detail with respect to FIG. 3, and updates the (p,s)-th element of the session matrix SM with the number of blocked calls. After running the simulation and updating the session matrix, processing continues at block 47.

Figure 3:
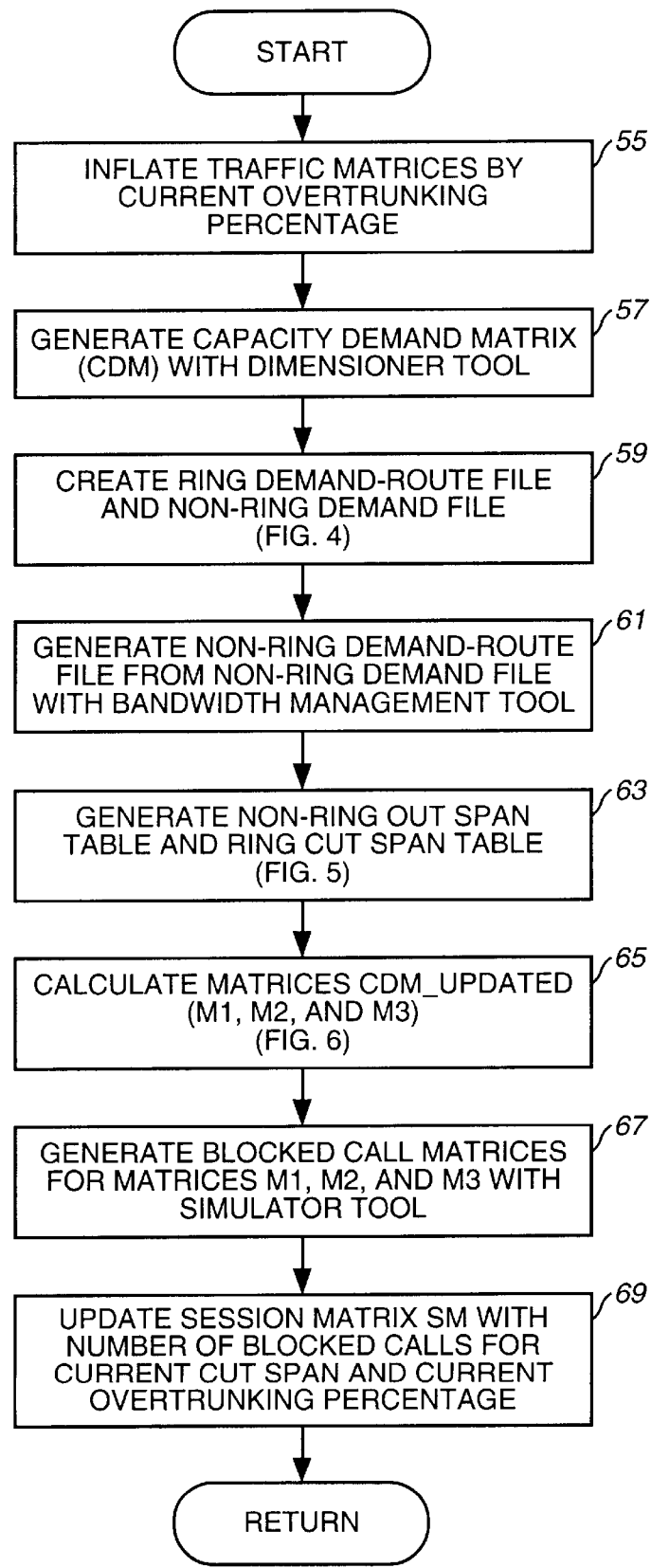
FIG. 3 is a flowchart of the running of a simulation for a selected overtrunking percentage and a selected cut span according to the present invention.

Referring now to FIG. 3, there is shown a flowchart of the running of a simulation for a selected overtrunking percentage P and cut span S, and updating the session matrix, indicated generally at block 53 of FIG. 2. First, the system inflates the mean and variance parts of the traffic matrices by the current overtrunking percentage, at block 55. If, for example, the current overtrunking percentage is 5%, then each mean and variance entry of each traffic matrix is multiplied by 1.05. The format of the output files is the same as the format of the input files. Each part of the output file is an N×N matrix, where N is the number of switches in the network.

After the system has inflated the traffic matrices, the system generates a capacity demand matrix (CDM) with the dimensioner tool, at block 57. Then, the system creates a ring demand-route file and a non-ring demand file, as indicated generally at block 59 and shown in detail with respect to FIG. 4. The system then generates a non-ring demand-route file from the non-ring demand file with a bandwidth management tool, at block 61. In the preferred embodiment, the bandwidth management tool is the tool described in U.S. Pat. No. 5,946,295, filed on May 23, 1997 and issued on Aug. 31, 1999, attorney docket number RIC-96-122 (20350.00020).

Figure 5:
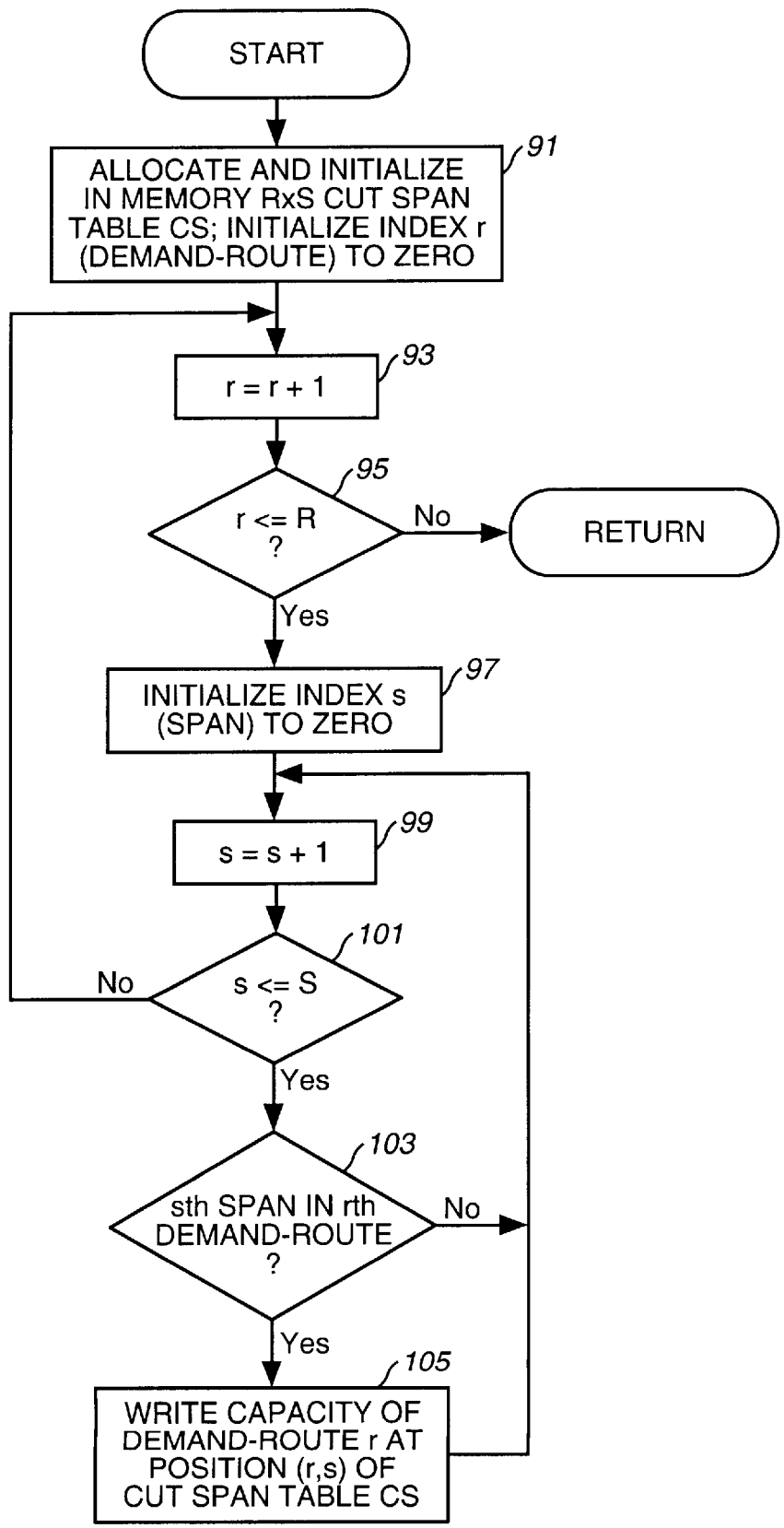
FIG. 5 is a flowchart of the generation of a cut span table according to the present invention.

After the system has generated the non-ring demand-route file, the system generates a non-ring cut span table and a ring cut span table, as indicated at block 63 and shown in detail with respect to FIG. 5. Then, the system calculates the updated capacity demand matrices M1, M2, and M3, as indicated at block 65 and shown in detail with respect to FIG. 6. After generating the updated capacity demand matrices, the system generates blocked call matrices for updated capacity demand matrices M1, M2, and M3 with the simulator tool, at block 67. Finally, the system updates the session matrix SM with the number of blocked calls for the current cut span and the current overtrunking percentage, at block 69, and returns to block 47 of FIG. 2.

Figure 4:
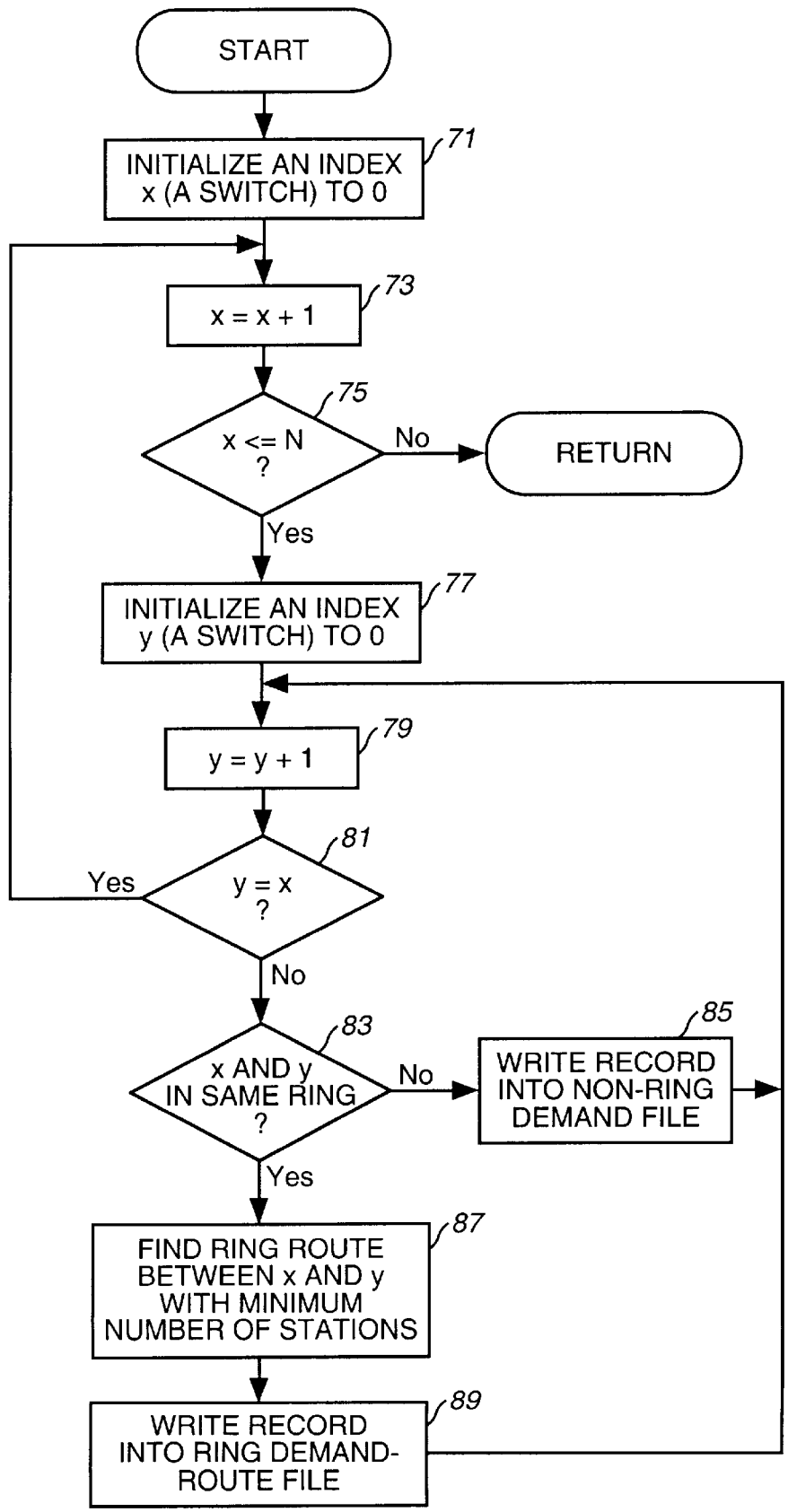
FIG. 4 is a flowchart of the creation of the ring demand-route file and the non-ring demand file according to the present invention.

Referring now to FIG. 4, there is shown the creation of the ring demand-route file and the non-ring demand file, indicated generally at block 59 FIG. 3. First, the system initializes an index x, which is the sequential number of a switch, to zero, at block 71. Then, the system sets x=x+1, at block 73, and tests, at decision block 75, if x is equal to or less than N, which is the number of switches in the network. If not, processing returns to block 61 of FIG. 3. If x is equal to or less than N, which indicates that not all columns of the capacity demand matrix have been processed, the system initializes an index y to zero, at block 77. Then, the system sets y=y+1, at block 79, and tests, at decision block 81, if y is equal to x. If so, which indicates that switches x and y are co-located, processing continues at block 73. If y is not equal to x, then the system tests, at block 83, if x and y are in the same ring. If x and y are not in the same ring, then the system writes a record into the non-ring demand file, at block 85, and returns to block 79. The format of the record in the non-ring demand file is switch x, switch y, and the capacity between switches x and y from the capacity demand matrix CDM.

If, at decision block 83, x and y are in the same ring, then the system finds the ring route between x and y with the minimum number of stations, at block 87. Then, the system writes a record into the ring demand-route file, at block 89, and returns to block 79. The format of the ring demand-route file is switch x, switch y, capacity between switches x and y from the capacity demand matrix CDM, and the list of intermediate nodes in the ring between switches x and y.

Referring now to FIG. 5, there is shown the generation of a cut span table. FIG. 5 processing is performed with respect to both the non-ring demand-route file generated with the bandwidth management tool, at block 61 of FIG. 3, and with respect to the ring demand-route file generated according to block 89 of FIG. 4. First, the system allocates and initializes in memory an R×S cut span table CS, where R is the number of demand-routes in the respective ring or non-ring demand-route file and S is the number of span in the set of cut spans, and initializes an index r (demand-route) to zero at block 91. Index r is a sequence number of a demand route record in either the ring demand route file or the non-ring demand route file. Then, the system sets r=r+1, at block 93, and tests, at decision block 95, if r is less than or equal to R. If not, which indicates that the ring or non-ring demand route table has been completely processed, processing returns to block 65 of FIG. 3. If, at decision block 95, r is less than or equal to R, then the system initializes an index s (a span) to zero, at block 97. Then, the system lets s=s+1, at block 99, and tests, at decision block 101, if s is less than or equal to S. If not, processing continues at block 93. If, at decision block 101, s is less than or equal to S, then the system tests, at decision block 103, if the s-th span is in the r-th demand route. If not, processing continues at block 99. If the s-th span is in the r-th demand route, then the system writes the capacity of demand route r at position (r,s) of the cut span table, at block 105, and processing continues at block 99.

Figure 6:
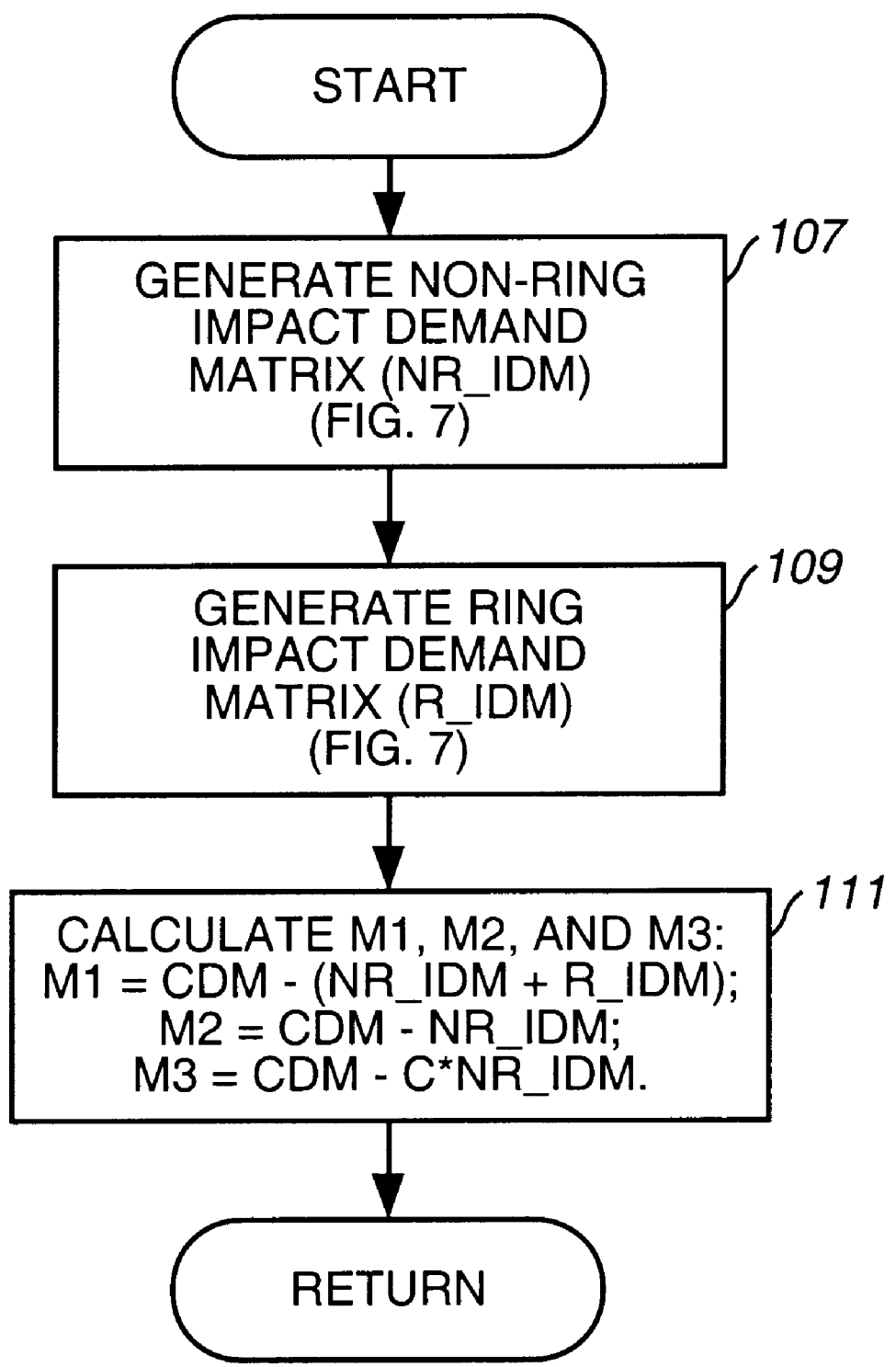
FIG. 6 is a flowchart of the calculation of updated capacity demand matrices according to the present invention.

Referring now to FIG. 6, there is shown processing of the calculation of updated capacity demand matrices M1, M2 and M3, which is indicated generally at block 65 of FIG. 3. First, the system generates a non-ring impact demand matrix, as indicated generally at block 107, and shown in detail with respect to FIG. 7. Then, the system generates a ring impact demand matrix, as indicated generally at block 109 and shown again in detail with respect to FIG. 7. Then, the system calculates matrices M1, M2, and M3, at block 111. Matrix M1 is equal to the capacity demand matrix minus the sum of the ring and non-ring impact demand matrices. Matrix M2 is equal to the capacity demand matrix minus the non-ring impact demand matrix. Matrix M3 is equal to the capacity demand matrix minus a restoration coefficient (C) times the non-ring impact demand matrix. Restoration coefficient C is equal to the amount of capacity not restored with non-ring restoration. For example, if 75% of the capacity of the network is restored after non-ring restoration, then C is equal to 25%. After the system has calculated matrices M1, M2, and M3, processing returns to block 67 of FIG. 3.

Figure 7:
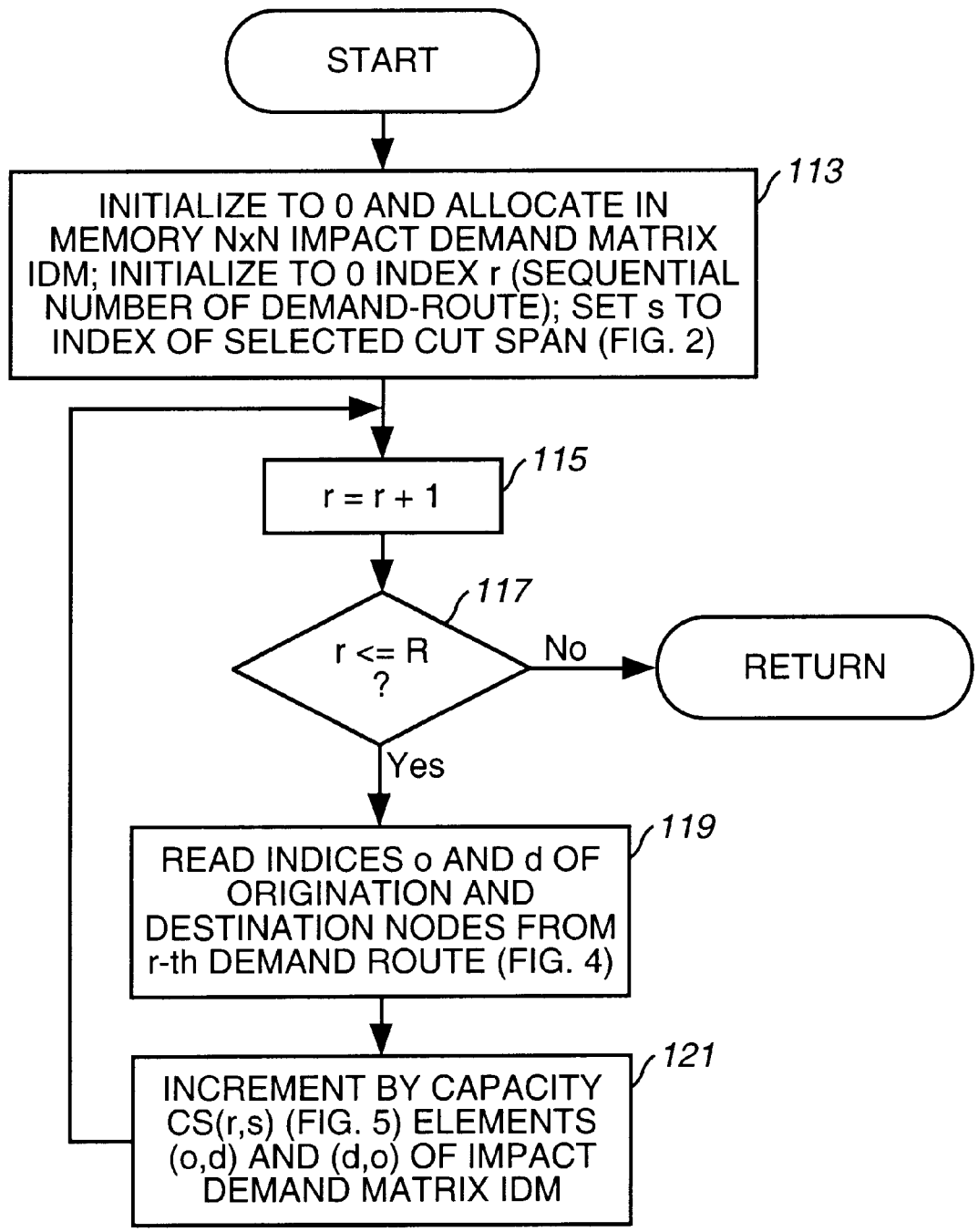
FIG. 7 is a flowchart of the generation of impact demand matrices according to the present invention.

Referring now to FIG. 7, there is shown the generation of the impact demand matrices, indicated generally at blocks 107 and 109 of FIG. 6. FIG. 7 processing generates both the non-ring impact demand matrix and the ring impact demand matrix from the respective non-ring and ring cut span tables. First, the system initializes to zero and allocates in memory an N×N impact demand matrix IDM, where N is the number of switches in the network, initializes to zero an index r, which is the a sequential number of a demand-route, and sets an index s to the selected cut span form FIG. 2, at block 113. Then, the system sets r=r+1, at block 115, and tests, at decision block 117, if r is less than or equal to R. If not, which indicates that all demand routes have been processed, the system returns to FIG. 6 processing. If, at decision block 117, r is equal to or less than R, then the system reads the indices o and d of the origination and destination switches of the r-th demand-route (from FIG. 5), at block 117. Then, the system increments by the capacity of element (r,s) of cut span table CS elements (o,d) and (d,o) of the impact demand matrix IDM, at block 119, and processing continues at block 115.

From the foregoing, it may be seen that the present invention provides an automated computer implemented system and method by which a network designer or analyst may determine an optimal level of excess capacity or overtrunking in a telecommunications network. The present invention has been illustrated and described with respect to a preferred embodiment. Those skilled in the art will recognize that feature of the invention may be used in combination with other features, all as would be apparent to one skilled in the art given the benefit of this disclosure.

What is claimed is:

1. A method of performing a computer simulation to determine a number of blocked calls resulting from cutting a selected span from a set of spans in a telecommunications network with a selected level of overtrunking, said telecommunications network comprising a plurality of nodes interconnected by spans, which comprises the computer implemented steps of:

forming a capacity demand matrix based on said selected level of overtrunking, said capacity demand matrix reflecting a circuit capacity between each pair of origination nodes and destination nodes of said network prior to a cut span;

forming an updated capacity demand matrix, said updated capacity demand matrix reflecting the circuit capacity between each pair of origination nodes and destination nodes of said network after a cut span from said set of spans;

running a call simulation program with data from said updated capacity demand matrix to determine a number of blocked calls resulting from said cut span.

2. The method as claimed in claim 1, wherein said step of forming an updated capacity demand matrix includes the computer implemented step of:

forming a first updated capacity demand matrix reflecting the capacity between each pair of origination nodes and destination nodes of said network after said cut span and prior to ring restoration of said network.

3. The method as claimed in claim 2, wherein said step of forming a first updated capacity demand matrix includes the computer implemented steps of:

forming a non-ring impact demand matrix, said non-ring impact demand matrix reflecting the amount of non-ring capacity that is lost between each pair of origination and destination nodes of said network when said selected span is cut;

forming a ring impact demand matrix, said ring impact demand matrix reflecting amount of ring capacity that is lost between each pair of origination and destination nodes of said network when said selected span is cut; and, subtracting from said capacity demand matrix the sum of said non-ring impact demand matrix and said ring impact demand matrix to form said first updated capacity demand matrix.

4. The method as claimed in claim 1, wherein said step of forming said capacity demand matrix includes the computer implemented steps of:

inflating a set of traffic matrices by a selected overtrunking percentage to form a set of inflated traffic matrices; and, dimensioning a network using said inflated traffic matrices to form said capacity demand matrix.

5. The method as claimed in claim 1, wherein said step of forming an updated capacity demand matrix includes the computer implemented step of:

generating a ring demand-route file and a non-ring demand file from said capacity demand matrix.

6. The method as claimed in claim 5, wherein said step of generating a ring demand-route file and a non-ring demand file includes the computer implemented steps of:

selecting an origination node from said capacity demand matrix;

selecting a destination node from said capacity demand matrix; and, if said selected origination node and said selected destination node are not in a common ring, writing a non-ring demand record in said non-ring demand file, said non-ring demand record comprising said selected origination node, said selected destination node, and the capacity between said selected origination node and said selected destination node.

7. The method as claimed in claim 6, including the computer implemented steps of:

if said selected origination node and said selected destination node are in a common ring, finding a route through said common ring between said origination node and said destination node with a minimum number of intermediate nodes; and, writing a ring demand-route record in said ring demand-route file, said ring demand-route record comprising said selected origination node, said selected destination node, said route through said common ring between said origination node and said destination node with a minimum number of intermediate nodes, and the capacity of said ring demand-route.

8. The method as claimed in claim 7, wherein said step of forming an updated capacity demand matrix includes the computer implemented step of:

generating a non-ring demand-route file from said non-ring demand file.

9. The method as claimed in claim 8, wherein said non-ring demand-route file is generated with a bandwidth management program.

10. The method as claimed in claim 8, wherein said step of forming an updated capacity demand matrix includes the computer implemented steps of:

generating a ring cut span table from said ring demand-route file, said ring cut span table including a row for each ring demand-route record of said ring demand-route file and a column for each span of said set of spans; and, generating a non-ring cut span table from said non-ring demand-route file, said non-ring cut span table including a row for each non-ring demand-route record of said non-ring demand-route file and a column for each span of said set of spans.

11. A method of performing a computer simulation to determine a number of blocked calls resulting from cutting a selected span in a telecommunications network with a selected level of overtrunking, which comprises the computer implemented steps of:

(a) inflating a set of traffic matrices by a selected overtrunking percentage to form a set of inflated traffic matrices;

(b) dimensioning a network using said inflated traffic matrices to form a capacity demand matrix;

(c) forming a ring demand-route file with data from said capacity demand matrix;

(d) forming a non-ring demand-route file with data from said capacity demand matrix;

(e) forming a ring cut span table with data from said ring demand-route file;

(f) forming a non-ring cut span table with data from said non-ring demand-route file;

(g) forming a ring impact demand matrix based upon said selected span and said ring cut span table;

(h) forming a non-ring impact demand matrix based upon said selected span and said non-ring cut span table;

(i) subtracting said ring impact demand matrix and said non-ring impact demand matrix from said capacity demand matrix to form a pre-restoration updated capacity demand matrix;

(j) running a simulator on said pre-restoration updated capacity demand matrix to determine a number of blocked calls resulting from a cut of said selected span with said selected overtrunking percentage prior to restoration.

12. The method as claimed in claim 11, including the computer implemented steps of:

(k) subtracting said non-ring impact demand matrix from said capacity demand matrix to form a post-ring-pre-non-ring restoration updated capacity demand matrix;

(l) running a simulator on said post-ring-pre-non-ring restoration updated capacity demand matrix to determine a number of blocked calls resulting from a cut of said selected span with said selected overtrunking percentage after ring restoration and prior to non-ring restoration.

13. The method as claimed in claim 12, including the computer implemented steps of:

(m) multiplying said non-ring restoration impact demand matrix by a restoration coefficient;

(n) subtracting said non-ring impact demand matrix multiplied by said restoration coefficient from said capacity demand matrix to form a post-non-ring restoration updated capacity demand matrix;

(o) running a simulator on said post-non-ring restoration updated capacity demand matrix to determine a number of blocked calls resulting from a cut of said selected span with said selected overtrunking percentage after non-ring restoration.

14. The method as claimed in claim 13, including the computer implemented step of:

(p) aggregating the numbers of blocked calls resulting from a cut of said selected span with said overtrunking percentage prior to ring restoration, after ring restoration and prior to non-ring restoration, and after non-ring restoration to form a aggregated number of blocked calls resulting from a cut of said selected span with said selected overtrunking percentage.

15. The method as claimed in claim 14, including the computer implemented step of:

(q) repeating steps (a) through (p) with a second selected overtrunking percentage.

16. The method as claimed in claim 15, including the computer implemented step of:

(r) repeating step (q) until said aggregated number of blocked calls is less than a blocked call threshold.

17. A system for determining a number of blocked calls resulting from cutting a selected span in a telecommunications network with a selected level of overtrunking, which comprises:

means for inflating a set of original traffic matrices by said selecting overtrunking percentage to form a set of inflated traffic matrices;

a dimensioning tool for generating a capacity demand matrix from said inflated traffic matrices;

means for generating a set of demand-routes from said capacity demand matrix;

means for generating an updated capacity demand matrix from said set of demand-routes based upon said selected span; and, a simulator for determining a number of blocked calls based upon an original traffic matrix and said updated capacity demand matrix.

* * * * *